(12) United States Patent
Nishijima

(10) Patent No.: US 9,337,745 B2
(45) Date of Patent: May 10, 2016

(54) INTEGRATED CIRCUIT DEVICE FOR POWER SUPPLY

(71) Applicant: FUJI ELECTRIC CO., LTD., Kawasaki-shi (JP)

(72) Inventor: Kenichi Nishijima, Matsumoto (JP)

(73) Assignee: FUJI ELECTRIC CO., LTD., Kawasaki-shi (JP)

( * ) Notice: Subject to any disclaimer, the term of this patent is extended or adjusted under 35 U.S.C. 154(b) by 164 days.

(21) Appl. No.: 14/179,735

(22) Filed: Feb. 13, 2014

(65) Prior Publication Data
US 2014/0233285 A1  Aug. 21, 2014

(30) Foreign Application Priority Data

Feb. 15, 2013  (JP) .................................. 2013-027841

(51) Int. Cl.
*H02M 3/07* (2006.01)
*H02M 7/217* (2006.01)
*H02M 1/36* (2007.01)
*H02M 1/32* (2007.01)

(52) U.S. Cl.
CPC ................ *H02M 7/217* (2013.01); *H02M 1/36* (2013.01); *H02M 3/07* (2013.01); *H02M 2001/322* (2013.01)

(58) Field of Classification Search
CPC ......... H02M 1/32; H02M 1/36; H02M 7/217; H02M 2001/322; H02M 3/06; H02M 3/07
See application file for complete search history.

(56) References Cited

U.S. PATENT DOCUMENTS

| | | | | |
|---|---|---|---|---|
| 6,906,934 B2* | 6/2005 | Yang | ....................... | H02M 1/36 323/299 |
| 7,375,991 B2* | 5/2008 | Shin | ........................ | H04N 5/63 348/E5.127 |
| 9,007,730 B2* | 4/2015 | Schmid | ............... | H02M 1/4208 361/18 |
| 2010/0309694 A1 | 12/2010 | Huang et al. | | |
| 2013/0147440 A1 | 6/2013 | Shiroyama et al. | | |
| 2013/0307490 A1* | 11/2013 | Amemiya | ............. | H02J 7/0029 320/162 |

FOREIGN PATENT DOCUMENTS

WO   WO-2012/033120 A1   3/2012

* cited by examiner

*Primary Examiner* — Matthew Nguyen
(74) *Attorney, Agent, or Firm* — Rabin & Berdo, P.C.

(57) ABSTRACT

An integrated circuit device, for a power supply that is connected to an AC power source via an input circuit having a capacitor, is able to reliably discharge the capacitor when the AC power source is interrupted. The integrated circuit device includes a first discharge circuit that operates in response to an internal supply voltage and discharges the capacitor via a first switch element that is turned on when the input voltage provided via the input circuit falls below a set voltage, and a second discharge circuit having a second switch element that is turned off when receiving the internal supply voltage but is turned on in response to the input voltage when the supply of internal supply voltage is interrupted.

10 Claims, 7 Drawing Sheets

INTEGRATED CIRCUIT DEVICE FOR POWER SUPPLY

BACKGROUND OF THE INVENTION

1. Field of the Invention

The present invention relates to an integrated circuit device for a power supply, connected to an AC power supply via an input circuit having a capacitor, and relates in particular to an integrated circuit device for a power supply, capable of reliably discharging a charge that has accumulated in the capacitor during interruption of the AC power supply.

2. Description of the Related Art

Integrated circuit devices for power supplies, which are connected to an AC power supply via an input circuit having a capacitor, are often used as control mechanisms for switching power devices that generate a specific DC voltage from the AC power supply. FIG. 4 is a schematic configuration diagram of a common, conventional switching power device, in which 1 is a switching power supply body formed primarily of an IGBT, MOS-FET or other switching element (not shown), and 2 is an integrated circuit device for a power supply (power IC), which performs PWM control of the switching power supply body 1.

In the figure, 3 is an input circuit constituting the input filter for the AC power supply ACin, and 4 is a rectifying circuit that performs full-wave rectification of the output from the input circuit 3 and supplies it to the switching power supply body 1. The power IC2 operates by rectifying the output (AC power supply ACin) of the input circuit 3 via rectifying diodes D1 and D2 during initial power activation, and then inputting it into a terminal VH to activate a start-up circuit 5. After the switching power supply body 1 has been activated, the power IC2 operates by inputting the output obtained from the switching power supply body 1 into a terminal VCC.

The power IC2 is itself provided with a J-FET (constant current diode) 6, which converts the power supplied to the terminal VH into constant current to activate the start-up circuit 5, and with a zener diode (constant voltage diode) 7, which converts the voltage applied to the terminal VCC into constant voltage and inputs it. The power IC2 operates by producing a specific internal supply voltage VDD from either the output of the start-up circuit 5 or the voltage applied to the terminal VCC, and supplying this internal supply voltage VDD to a PWM control circuit or the like (not shown).

The PWM control circuit performs on/off control of the switching power supply body 1, specifically the switching element, in accordance with information input to the respective terminals FB, CS and LAT. Various systems have previously been proposed for the PWM control circuits in the switching power supply body 1 and power IC2, but they do not directly relate to the purport of the invention.

This kind of switching power device is also provided with a discharge circuit for discharging the charge that accumulates in the capacitor Cx of the input circuit 3 when the AC power supply ACin is interrupted (when the power is off). Specifically, as shown in FIG. 4, a discharge resistor Rx is connected parallel to the capacitor Cx. However, when the input circuit 3 is provided with a discharge resistor Rx as a discharge circuit, there is a risk of power loss from the discharge resistor Rx.

Therefore, it has been proposed that an electronic discharge circuit 8 be incorporated into the power IC2 in place of the discharge resistor Rx as shown in FIG. 5 for example, in order to prevent power loss from the discharge resistor Rx (see, for example, US Patent No. 2010/0309694 (Specification) and WO 2012/033120). With so-called IC discharge such as this electronic discharge circuit 8, it is possible to keep the loss to roughly zero (0) and increase the efficiency of the switching power device regardless of the capacity of the capacitor Cx as shown in FIG. 6.

However, because the electronic discharge circuit 8 shown in FIG. 5 operates in response to the internal supply voltage VDD of the power IC2, it ceases to function if the internal supply voltage VDD is lost. This means that it may not be possible to discharge the charge that has accumulated in the capacitor Cx if the AC power supply ACin is interrupted. The most common reason for loss of the internal supply voltage VDD is failure of the terminal VCC as shown in FIG. 7.

SUMMARY OF THE INVENTION

In light of these circumstances, it is an object of the present invention to provide an integrated circuit device for a power supply whereby a charge that has accumulated in the capacitor of an input circuit during interruption of the AC power supply ACin can be reliably discharged even when the internal supply voltage is lost.

To achieve this object, the integrated circuit device for a power supply of the invention is connected to an AC power supply via an input circuit having a capacitor, and features a first discharge circuit that operates in response to the internal supply voltage and is turned on when the input voltage supplied via the input circuit falls below a set voltage, to discharge a charge that has accumulated in the capacitor, and a second discharge circuit that is turned off when receiving the internal supply voltage but is turned on in response to the input voltage when the supply of the internal supply voltage is interrupted, to discharge a charge that has accumulated in the capacitor.

The first discharge circuit is formed of a first switch element connected to an input power line via a discharge resistor for example, a voltage-dividing circuit that divides and outputs the input voltage applied to the input power line, and a switch drive circuit that operates in response to the internal supply voltage and turns on the first switch element when the output voltage of the voltage-dividing circuit falls below a preset first threshold voltage.

The second discharge circuit is formed of a second switch element connected to an input power line via a discharge resistor for example, and a switch control circuit that is driven in response to the internal supply voltage to turn off the second switch element, and also applies the input voltage to the second switch element to turn on the second switch element when the supply of the internal supply voltage is interrupted.

Preferably, the first discharge circuit is configured to include: a first switch element connected to an input power line via a discharge resistor; a voltage-dividing circuit that divides and outputs an input voltage applied to the input power line; a voltage-dividing control circuit that is driven in response to the internal supply voltage and alters the division ratio of the voltage-dividing circuit to set the output voltage of the voltage-dividing circuit to a low value, and also sets the output voltage of the voltage-dividing circuit to a high value when the internal supply voltage is lost; and a switch drive circuit that is driven in response to the internal supply voltage to turn on the first switch element when the output voltage of the voltage-dividing circuit falls below a preset first threshold voltage, while the second discharge circuit is configured to include: a second switch element connected to an input power line via a discharge resistor; and a switch control circuit that operates in response to the internal supply voltage to turn off the second switch element when the output voltage of the voltage-dividing circuit falls below a second threshold value that is set higher than the first threshold value, and also applies the output voltage of the voltage-dividing circuit to the second switch element to turn on the second switch element when the internal supply voltage is lost.

Preferably, the voltage-dividing circuit is formed of serially-connected first and second resistors mounted between an input power line and a ground line, and the voltage-dividing control circuit is formed of a third switch element that is turned on in response to the internal power supply and connects a third resistor in parallel to the second resistor on the ground line side in the voltage-dividing circuit.

The switch control circuit is formed of a switching inhibition circuit that operates in response to the internal power supply for example to turn off the second switch element when the output voltage of the voltage-dividing circuit falls below a second threshold voltage that is set higher than the first threshold voltage, and a diode that applies the output voltage of the voltage-dividing circuit to the second switch element to turn on the second switch element when the switching inhibition circuit ceases to operate due to loss of the internal supply voltage.

The switch drive circuit comprises a discharge timer circuit that turns on the first switch element for a set amount of time when the output voltage of the voltage-dividing circuit falls below the first threshold voltage for example. The switching inhibition circuit maintains the drive voltage of the second switch element at zero to thereby turn off the second switch element as long as the output voltage is below the second threshold voltage. This can be achieved by means of a discrimination circuit formed of two serially-connected logic inverter circuits for example.

With an integrated circuit device for a power supply of this configuration, because the second discharge circuit (which is driven by input voltage) functions even in cases in which the internal supply voltage is lost due to terminal failure for example and the first discharge circuit of the IC discharge function ceases to function as a result, charge that has accumulated in the capacitor of the input circuit can be reliably discharged by the second discharge circuit in place of the first discharge circuit.

In particular, the second discharge circuit blocks the discharge path of the capacitor when the internal supply voltage is available, ceding discharge control of the capacitor to the first discharge circuit, and only controls the discharge of the capacitor when the internal supply voltage is not available. It is thus possible to reliably discharge the charge remaining in the capacitor when the supply of the AC power supply is interrupted, thereby complying with the safety standards of an integrated circuit device for a power supply. The device also offers many practical advantages because it has a simple design.

DESCRIPTION OF THE PREFERRED EMBODIMENTS

The integrated circuit device for a power supply of an embodiment of the present invention is explained below with reference to the drawings.

Figure 1:
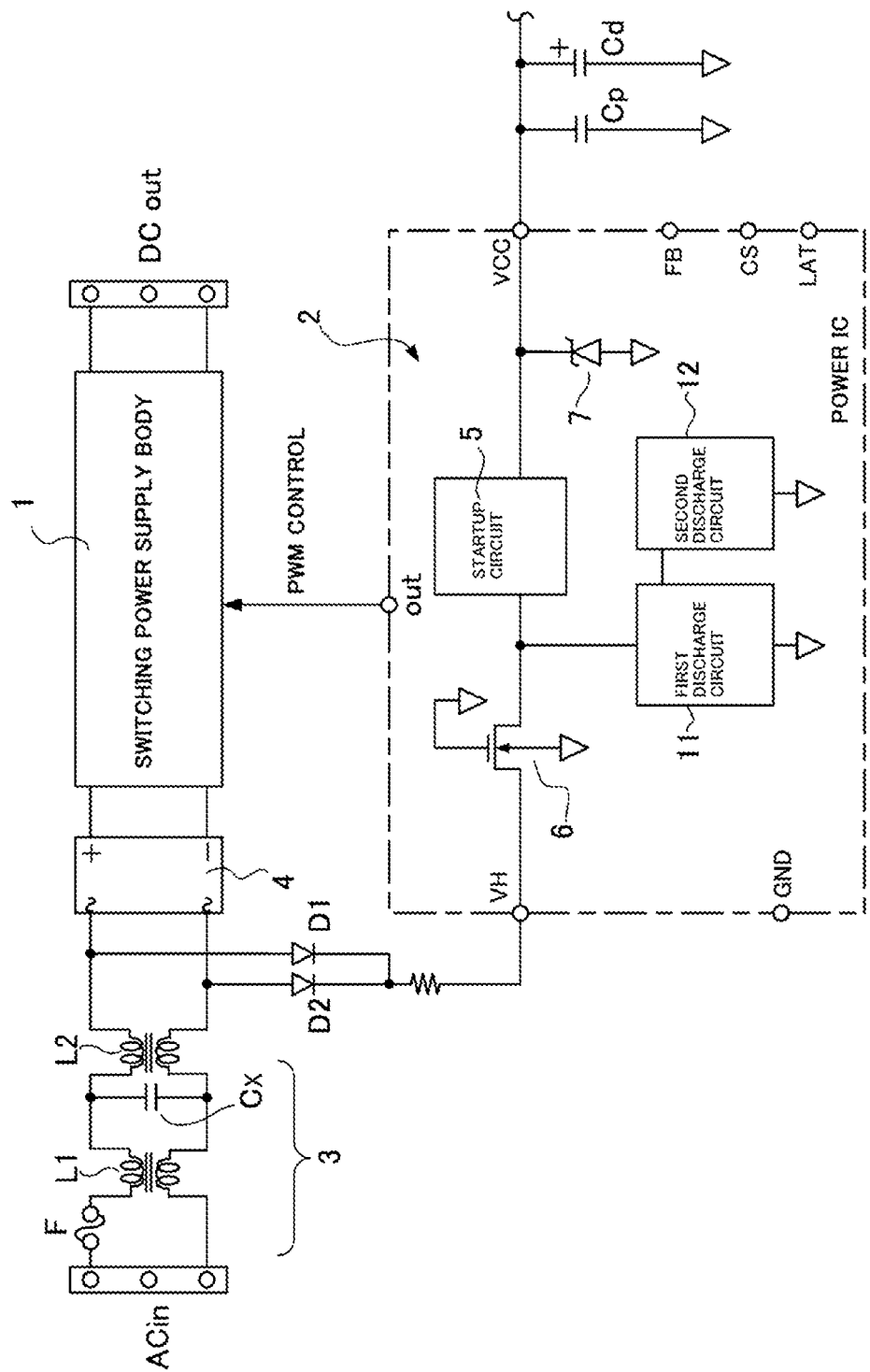
FIG. 1 is a schematic configuration diagram of the essential parts of a switching power device configured with the integrated circuit device for a power supply of an embodiment of the invention.
Figure 4:
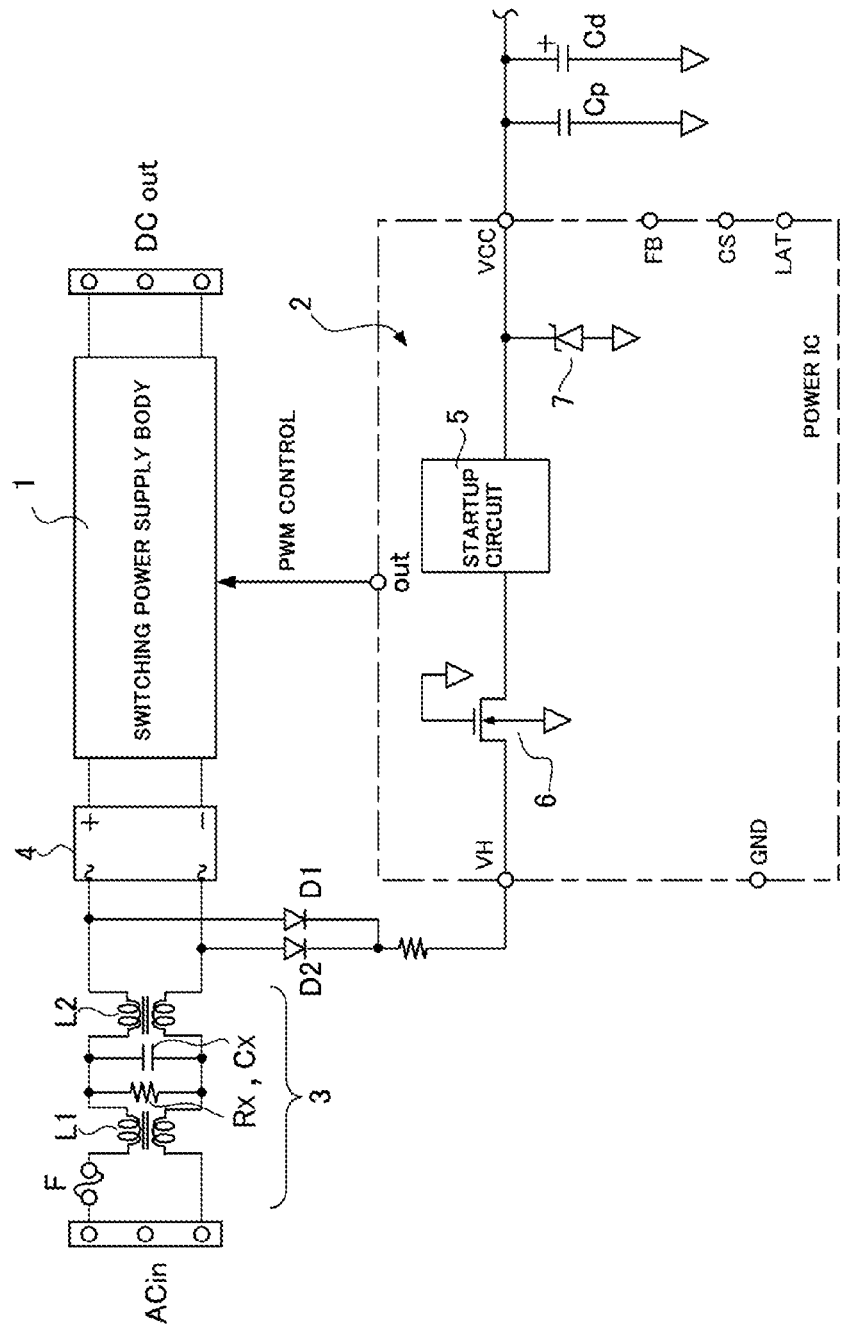
FIG. 4 is a schematic configuration diagram of the essential parts of a switching power device provided with a discharge resistor in the input circuit.

FIG. 1 is a schematic configuration diagram of the essential parts of a switching power device configured with the integrated circuit device for a power supply of an embodiment of the invention. Like the switching power devices shown in FIGS. 4 and 5, this switching power device is configured with a switching power supply body 1 connected to an AC power supply ACin via an input circuit 3 and a rectifying circuit 4, together with an integrated circuit device for a power supply (power IC) 2, which is connected to the AC power supply ACin via the input circuit 3, and performs PWM control of the switching power supply body 1.

Figure 5:
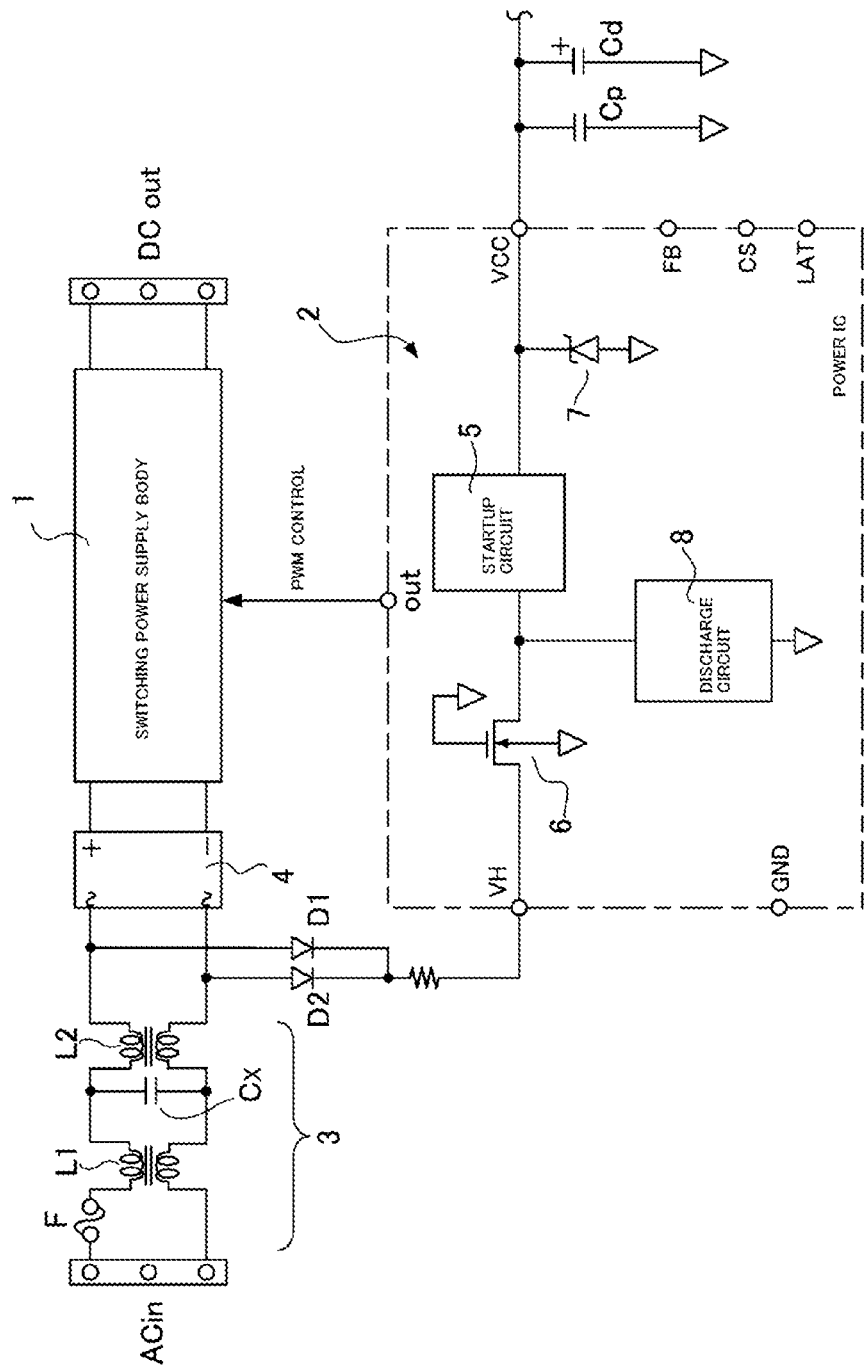
FIG. 5 is a schematic configuration diagram of the essential parts of a switching power device provided with an electronic discharge circuit in the integrated circuit device for a power supply.
Figure 6:
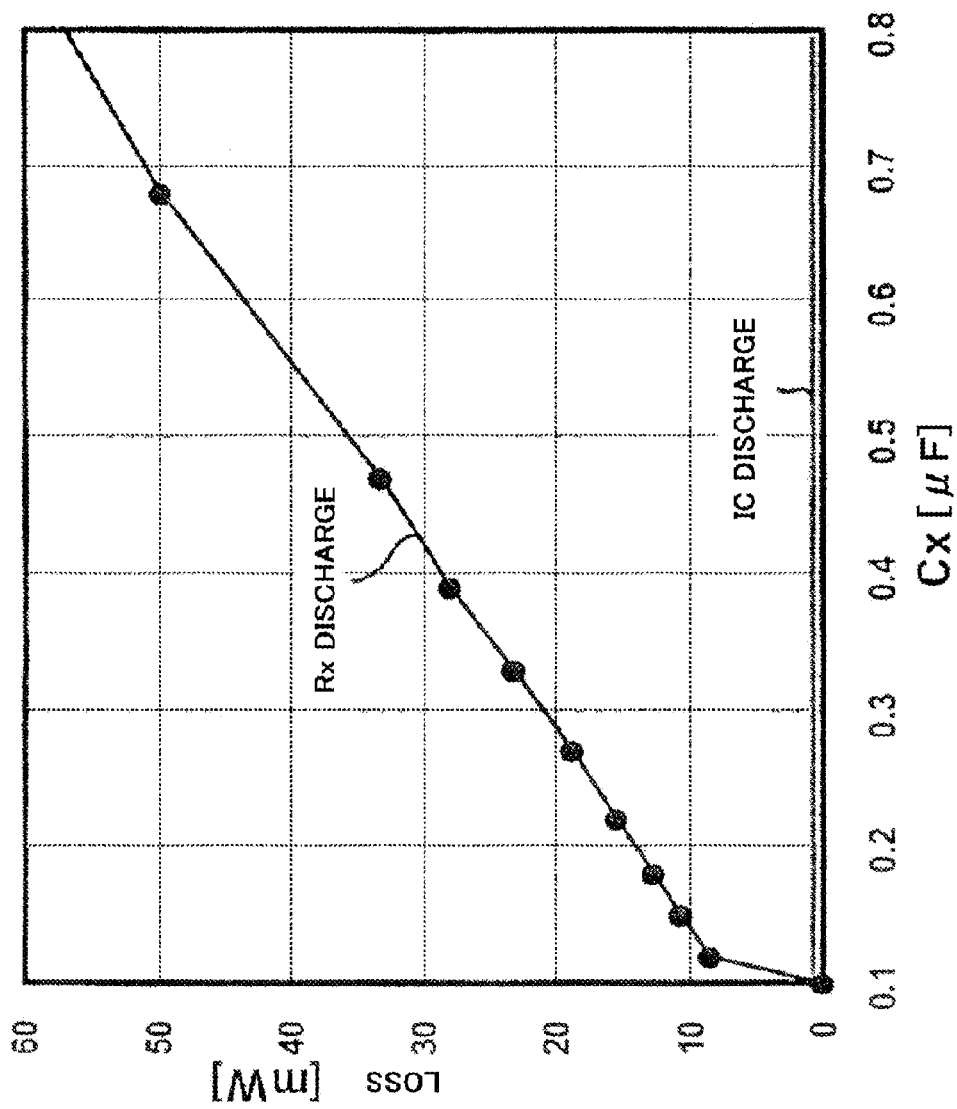
FIG. 6 shows a comparison of loss due to resistance discharge and loss due to IC discharge depending on the capacity of the capacitor.
Figure 7:
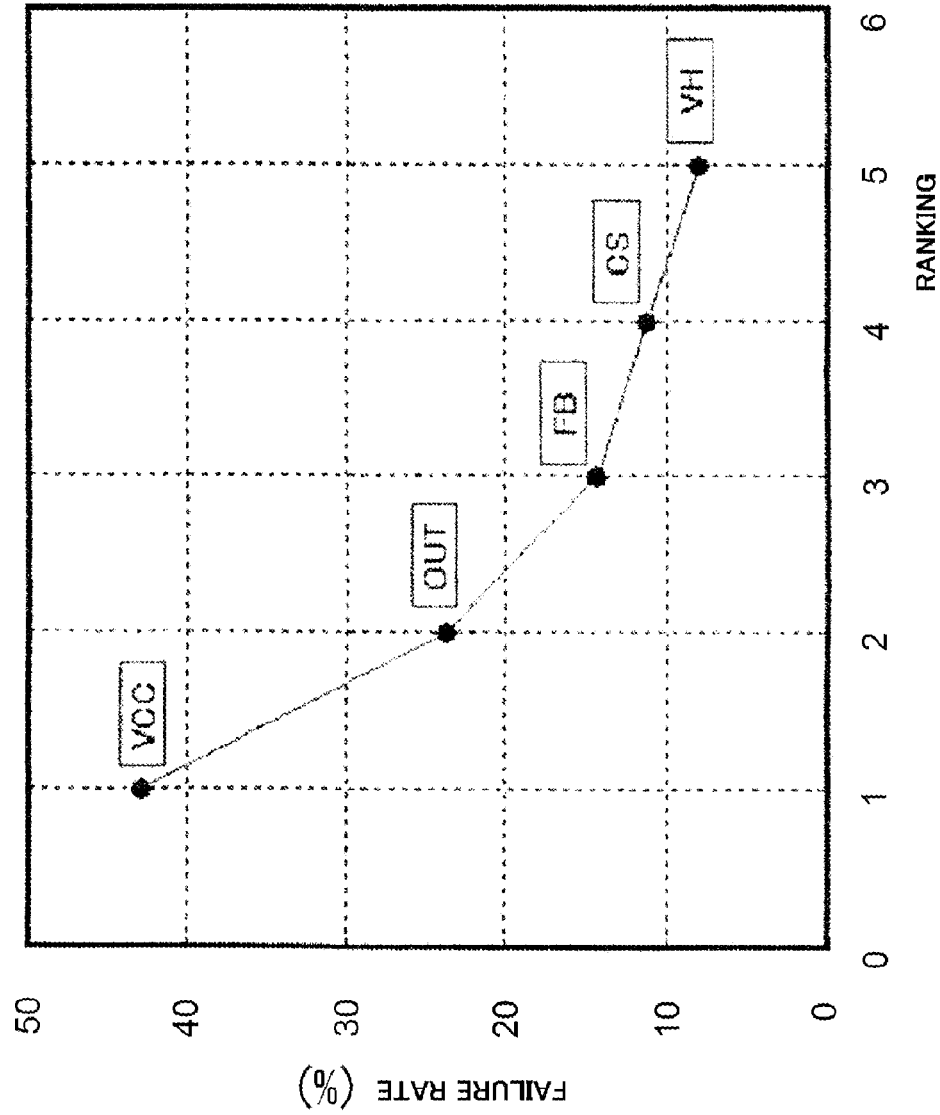
FIG. 7 shows the rates of terminal failure as a cause of loss of internal supply voltage.

In particular, in addition to a first discharge circuit 11 corresponding to the electronic discharge circuit 8 shown in FIG. 5 above, the IC2 of this embodiment features a second discharge circuit 12, which operates in response to input voltage applied to the terminal VH and discharges a charge that has accumulated in a capacitor Cx provided in the input circuit 3. The first discharge circuit 11 operates in response to the internal supply voltage VDD of the power IC2, and serves the function of discharging a charge that has accumulated in the capacitor Cx of the input circuit 3 during interruption of the AC power supply ACin. Because it operates in response to the input voltage Vin applied to the terminal VH, the second discharge circuit 12 serves the function of discharging the accumulated charge in the capacitor Cx in place of the first discharge circuit 11 when the internal supply voltage VDD is unavailable.

Figure 2:
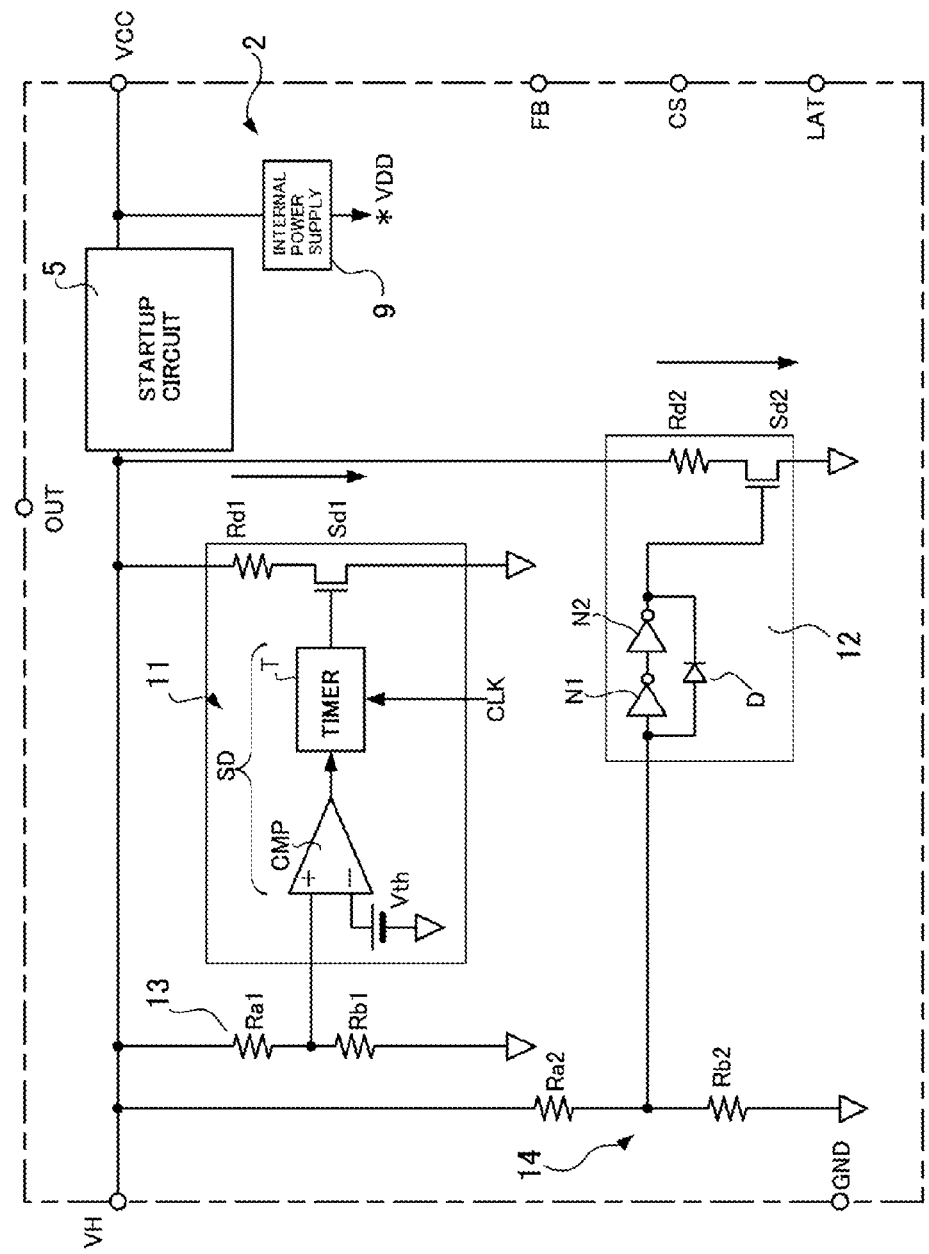
FIG. 2 is a schematic configuration diagram of an integrated circuit device for a power supply of the first embodiment of the invention.

Specifically, as shown by a schematic configuration diagram of the essential parts of the power IC2 of the first embodiment of the invention in FIG. 2, the first discharge circuit 11 is provided with a first switch element Sd1 formed of a MOS-FET or the like, and connected to an input power line leading to the terminal VH via a discharge resistor Rd1. The first discharge circuit 11 is also provided with a first voltage-dividing circuit 13 which is formed of serially-connected resistors Ra1 and Rb1 and divides and outputs the input voltage Vin applied to the input power line. The first discharge circuit 11 is also configured with a switch drive circuit SD which operates in response to the internal supply voltage VDD and turns on the first switch element Sd1 when the output voltage of the voltage-dividing circuit 13 falls below a preset first threshold voltage Vth, thereby forming a discharge path for the capacitor Cx.

This switch drive circuit SD is formed of a comparator CMP, which compares the output voltage of the voltage-dividing circuit 13 with the preset threshold voltage Vth, and a timer circuit T, which operates in response to the output from the comparator CMP when the output voltage falls below the first threshold voltage Vth, turning on the first switch Sd1 for a set amount of time. The comparator CMP and timer circuit T are formed of electronic circuits that operate in response to the internal supply voltage VDD. Thus, a switch drive circuit SD configured with this comparator CMP and timer circuit T has the property of ceasing to function when the internal supply voltage VDD is lost due to terminal failure or the like.

Because the resistors Ra1 and Rb1 making up the first voltage-dividing circuit 13 are only responsible for dividing and detecting the input voltage Vin, high resistance on the order of tens of MΩ is used. Moreover, the resistance ratio of the resistors Ra1 and Rb1 is set so that when the input voltage Vin applied to the terminal VH is within a preset normal voltage range, the output voltage is somewhat higher than the threshold voltage Vth set at the comparator CMP.

Similarly, the second discharge circuit 12 is provided with a second switch element Sd2 formed of a MOS-FET or the like, and connected to the input power line via a discharge resistor Rd2. The second discharge circuit 12 is also provided with a second voltage-dividing circuit 14 which is formed of serially-connected resistors Ra2 and Rb2 and divides and outputs the input voltage Vin applied to the input power line. Moreover, the second discharge circuit 12 is also provided with a switching inhibition circuit that that is driven in response to the internal supply voltage VDD and turns off the second switch element Sd2.

The switching inhibition circuit itself is formed of, for example, two serially-connected logic inverter circuits (NOT circuits) N1 and N2, which operate in response to the internal supply voltage VDD. This switching inhibition circuit functions to keep the gate voltage of the second switch element Sd2 at zero (0 V) by maintaining the logic output of the second logic inverter circuit (NOT circuit) N2 at a low level (L) when the output voltage of the second voltage-dividing circuit 14 is below the logic inversion threshold of the first logic inverter circuit (NOT circuit) N1, thereby forcibly turning off the second switch element Sd2.

The second discharge circuit 12 is also provided with a diode D parallel to the switching inhibition circuit. This diode D serves the function of turning on the second switch element Sd2 by applying the input voltage Vin to the gate of the second switch element Sd2 when the internal supply voltage VDD is lost and the switching inhibition circuit ceases to function as a result. Specifically, the diode D turns on the second switch element Sd2 by applying the output voltage of the second voltage-dividing circuit 14 to the gate of the second switch element Sd2 when the output voltage of the second voltage-dividing circuit 14 exceeds the operating threshold of the second switch element Sd2. A discharge path for the capacitor Cx via the discharge resistor Rd2 is formed by turning on this second switch element Sd2.

Because the resistors Ra2 and Rb2 constituting the second voltage-dividing circuit 14 only serve to divide and detect the input voltage Vin and turn on the second switch element Sd2, high resistance on the order of tens of MΩ is used. Moreover, the resistance ratio of the resistors Ra2 and Rb2 is set so that the output voltage is lower than the logic inversion threshold of the logic inverter circuit (NOT circuit) N1 and sufficiently higher than the operating threshold of the second switch element Sd2 when the input voltage Vin applied to the terminal VH is within a preset normal voltage range.

Because the discharge resistors Rd1 and Rd2 serve the function of rapidly discharging within a set amount of time the charge that has accumulated in the capacitor Cx during interruption of the AC power supply ACin when the power switch is turned off for example, resistance on the order of hundreds of kΩ is normally used. Reference numeral 9 in FIG. 2 indicates an internal power supply circuit that generates the internal supply voltage VDD and supplies it to the PWM control circuit (not shown), the first discharge circuit 11, and the second discharge circuit 12. The J-FET (constant current diode) 6 and zener diode (constant voltage diode) 7 shown in FIG. 1 are omitted in FIG. 2.

With a power IC2 configured in this way, the output voltage of the first voltage-dividing circuit 13 that divides the input voltage Vin is kept higher than the threshold voltage Vth when the power IC2 functions normally and internal supply voltage VDD is being generated. Therefore, the first switch element Sd1 of the first discharge circuit 11 remains off. At the same time, the output voltage of the second voltage-dividing circuit 14 that divides the input voltage Vin is kept lower than the logic inversion threshold of the logic inverted circuit (NOT circuit) N1. Therefore, the second switch element Sd2 of the second discharge circuit 12 remains off.

When the AC power supply ACin is interrupted by turning off the power switch for example, there is a drop in the input voltage Vin and consequently in the output voltage of the first voltage-dividing circuit 13. In this case, the power IC2 continues to operate and to generate internal supply voltage VDD for a set amount of time while the input voltage Vin drops to the operating voltage of the undervoltage lockout circuit (UVLO). Thus, the first discharge circuit 11 continues to operate for a set amount of time even when the AC power supply ACin is interrupted.

As a result, when the output voltage of first voltage-dividing circuit 13 falls below the threshold voltage Vth as the input voltage Vin drops, the output of the comparator CMP is inverted. The timer circuit T is then activated in response to the inverted output of the comparator CMP, turning on the first switch element Sd1 for a set amount of time. Turning on this first switch element Sd1 serves to form a discharge path for the capacitor Cx via the discharge resistor Rd1, and the residual charge that has accumulated in the capacitor Cx is rapidly discharged.

On the other hand, when the internal supply voltage VDD is not being generated due to failure of the terminal VCC or the like, both the first discharge circuit 11 and the PWM control circuit cease to function. At the same time, the switching inhibition circuits (logic inverter circuits N1 and N2) in the second discharge circuit 12 also cease to function due to loss of the internal supply voltage VDD. The AC power supply ACin is then cut off by means of error processing of the switching power device.

The output voltage of the second voltage-dividing circuit 14 (the divided input voltage Vin) is then applied to the second switch element Sd2 via the second voltage-dividing circuit 14. When the AC power supply ACin is interrupted (cut off), because the output voltage of the second voltage-dividing circuit 14 is sufficiently higher than the operating threshold voltage of the second switch element Sd2, the second switch element Sd2 is turned on by the output voltage. When this second switch element Sd2 is on, a discharge path for the capacitor Cx is formed via the discharge resistor Rd2, and the residual charge that has accumulated in the capacitor Cx is discharged. That is, when the internal supply voltage VDD is lost, the charge that has accumulated in the capacitor Cx is rapidly discharged via the second discharge circuit 12.

Thus, with a power IC2 configured with a first discharge circuit 11 and a second discharge circuit 12 as described above, it is possible to reliably discharge the charge of the capacitor Cx without relying on the internal supply voltage VDD when the AC power supply ACin is interrupted. It is thus possible to increase the reliability of the discharge function of the power IC2, and comply adequately with safety standards for the discharge of the capacitor Cx. The practical advantages are also great because the residual charge of the capacitor Cx can be discharged easily and effectively.

Figure 3:
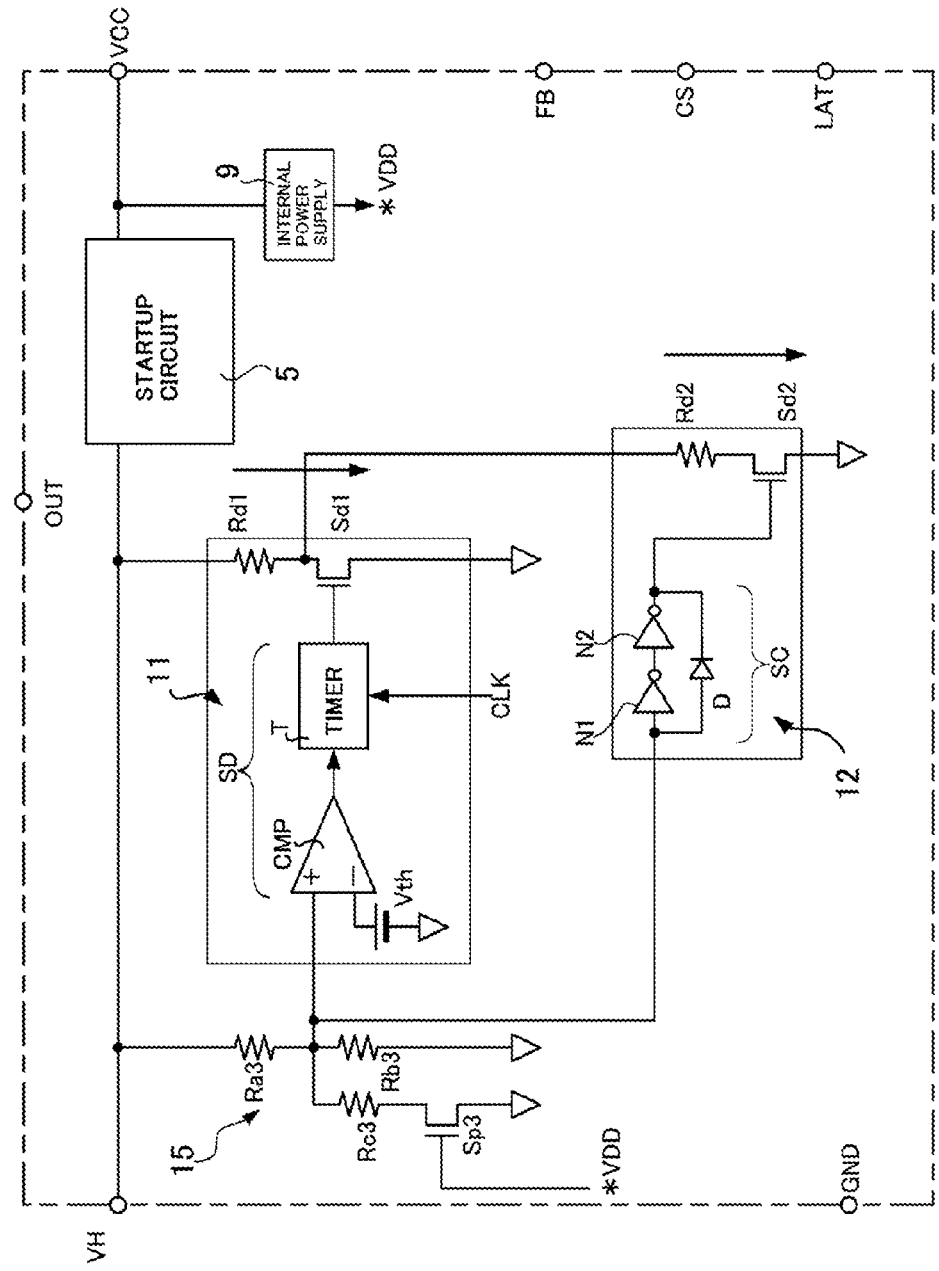
FIG. 3 is a schematic configuration diagram of an integrated circuit device for a power supply of the second embodiment of the invention.

FIG. 3 shows a schematic configuration diagram of the essential parts of a power IC2 of the second embodiment of the invention. In this power IC2 of the second embodiment, the first and second voltage-dividing circuits 13 and 14 are combined into one voltage-dividing circuit 15 capable of changing the voltage division ratio according to the presence or absence of the internal supply voltage VDD. At the same time, the discharge resistor Rd2 of the second discharge circuit 12 is serially connected to the discharge resistor Rd1 of the first discharge circuit 11. In other words, the discharge path of the capacitor Cx via the second switch element Sd2 is formed serially via the discharge resistors Rd1 and Rd2. The output voltage of this voltage-dividing circuit 15 is then supplied in common to the first and second discharge circuits 11 and 12.

The voltage-dividing circuit 15 here is formed of serially-connected resistors Ra3 and Rb3 mounted between the input voltage line and the ground line, and resistor Rc3, which is connected in parallel to the resistor Rb3 via a third switch element Sp3. The third switch element Sp3 is turned on in response to the internal supply voltage VDD, connects the resistor Rc3 in parallel to the resistor Rb3, and when the internal supply voltage VDD is lost, the third switch element Sp3 functions to alter the division ratio by separating the resistor Rc3 from the resistor Rb3.

The resistors Ra3 and Rb3 are themselves set with the same resistance ratio as in the second voltage-dividing circuit 14 for example. Moreover, the ratio of the resistance value of the resistor Rc3 in parallel to the resistor Rb3 [(Rb3×Rc3)/(Rb3+Rc3)] and the resistor Ra3 is set the same as the resistance ratio of the first voltage-dividing circuit 13 above Like the resistors Ra1, Rb1, Ra2 and Rb2 above, these resistors Ra3, Rb3 and Rc3 are only responsible for dividing and detecting the input voltage Vin or for turning on the second switch element Sd2, so high resistance on the order of tens of MΩ is used.

With a power IC2 configured in this way, because the division ratio of the voltage-dividing circuit 15 changes according to the presence or absence of the internal supply voltage VDD, the capacitor Cx is discharged by the first discharge circuit 11 under normal circumstances when the internal supply voltage VDD is being supplied. When the internal supply voltage VDD is not supplied, however, discharge of the capacitor Cx is performed by the second discharge circuit 12. Thus, as in the first embodiment described above, it is possible to reliably discharge the residual charge of the capacitor Cx when the AC power supply ACin is interrupted without relying on the internal supply voltage VDD.

The present invention is not limited to the aforementioned embodiments. For example, various circuit systems that have been proposed in the past can be applied appropriately to the configuration of the first discharge circuit 11. In the case of the second discharge circuit 12, it is possible for example to forcibly turn off the second switch element Sd2 using a logic inverter circuit (comparator) that returns the output to zero (0 V) in response to the internal supply voltage VDD for example. Various other modifications that do not detract from the intent of the present invention may also be implemented.

EXPLANATION OF REFERENCE NUMERALS

1 Switching power supply body
2 Integrated circuit device for a power supply (power IC)
3 Input circuit
4 Rectifying circuit
5 Start-up circuit
6 J-FET (constant current diode)
7 Zener diode (constant voltage diode)
8 Electronic discharge circuit
9 Internal supply circuit
11 First discharge circuit
12 Second discharge circuit
13 First voltage-dividing circuit
14 Second voltage-dividing circuit
15 Voltage-dividing circuit
Cx Capacitor
Sd1 First switch element (MOS-FET)
Sd2 Second switch element (MOD-FET)
Sp3 Third switch element (MOS-FET)
Rd1, Rd2 Discharge resistor
Ra1, Rb1, Ra2, Rb2, Ra3, Ra3, Rc3 Voltage dividing resistor
SD Switch drive circuit
CMP Comparator
T Timer circuit
SC Switch control circuit
D Diode
N1, N2 Logic inverter circuit (switching inhibition circuit)

What is claimed is:

1. An improved integrated circuit device for supplying control signals to a power supply that is connected to an AC power supply via an input circuit having a capacitor, wherein the integrated circuit device includes an internal power supply and wherein the improvement comprises:
 a first discharge circuit that operates using an internal supply voltage generated by the internal power supply and is turned on to discharge the capacitor when an input voltage supplied to the integrated circuit device via the input circuit falls below a predetermined voltage; and
 a second discharge circuit that is turned off when receiving the internal supply voltage but is turned on to discharge the capacitor in response to the input voltage if the internal power supply stops generating the internal supply voltage, the second discharge circuit having a circuit design that is different from the circuit design of the first discharge circuit.

2. The integrated circuit device for a power supply according to claim 1, further comprising an input power line that receives the input voltage, and wherein the first discharge circuit includes a resistor, a first switch element connected to the input power line via the resistor, a voltage-dividing circuit connected to the input power line, and a switch drive circuit that operates using the internal supply voltage and turns on the first switch element when an output voltage of the voltage-dividing circuit falls below a preset first threshold voltage.

3. The integrated circuit device for a power supply according to claim 2, wherein the switch drive circuit includes a discharge timer circuit that turns the first switch element on for a predetermined amount of time when the output voltage of the voltage-dividing circuit falls below the first threshold voltage.

4. The integrated circuit device for a power supply according to claim 1, further comprising an input power line that receives the input voltage, and wherein the second discharge circuit includes a resistor, a second switch element connected to the input power line via the resistor, and a switch control circuit that is driven using the internal supply voltage to turn the second switch element off, and that also turns the second switch element on when the internal power supply stop generating the internal supply voltage.

5. An improved integrated circuit device for supplying control signals to a power supply that is connected to an AC power supply via an input circuit having a capacitor, wherein the improvement comprises:
- a first discharge circuit that operates using an internal supply voltage of the integrated circuit and is turned on to discharge the capacitor when an input voltage supplied to the integrated circuit device via the input circuit falls below a predetermined voltage; and
- a second discharge circuit that is turned off when receiving the internal supply voltage but is turned on to discharge the capacitor in response to the input voltage when the supply of the internal supply voltage is interrupted,
- wherein the integrated circuit device includes an input power line that receives the input voltage,
- wherein the first discharge circuit includes a first resistor, a first switch element connected to the input power line via the first resistor, a voltage-dividing circuit that is connected to the input power line, a voltage-dividing control circuit that is driven in response to the internal supply voltage and alters a division ratio of the voltage-dividing circuit to set an output voltage of the voltage-dividing circuit to a low value, and that also sets the output voltage of the voltage-dividing circuit to a high value when the supply of the internal supply voltage is interrupted, and a switch drive circuit that is driven in response to the internal supply voltage to turn the first switch element on when the output voltage of the voltage-dividing circuit falls below a predetermined first threshold voltage, and
- wherein the second discharge circuit includes a second resistor, a second switch element connected to the input power line via the second resistor, and a switch control circuit that operates using the internal supply voltage to turn the second switch element off when the output voltage of the voltage-dividing circuit falls below a second threshold value, and that also applies the output voltage of the voltage-dividing circuit to the second switch element to turn the second switch element on when the supply of the internal supply voltage is interrupted, the second threshold value being higher than the first threshold value.

6. The integrated circuit device for a power supply according to claim 5,
- wherein the voltage-dividing circuit comprises serially-connected first and second resistors connected between the input power line and a ground line, and
- wherein the voltage-dividing control circuit comprises a third resistor, and a third switch element that is turned on using the internal power supply and connects the third resistor in parallel to the second resistor on a ground side of the voltage-dividing circuit.

7. The integrated circuit device for a power supply according to claim 5, wherein the switch control circuit comprises a switching inhibition circuit that operates using the internal power supply to turn the second switch element off when the output voltage of the voltage-dividing circuit falls below a second threshold voltage that is higher than the first threshold voltage, and a diode that applies the output voltage of the voltage-dividing circuit to the second switch element to turn the second switch element on if the switching inhibition circuit ceases to operate due to loss of the internal supply voltage.

8. The integrated circuit device for a power supply according to claim 4, wherein the switch drive circuit includes a discharge timer circuit that turns the first switch element on for a predetermined amount of time when the output voltage of the voltage-dividing circuit falls below the first threshold voltage.

9. The integrated circuit device for a power supply according to claim 7, wherein the switching inhibition circuit comprises a discrimination circuit that maintains a drive voltage of the second switch element at zero to thereby turn the second switch element off when the output voltage is below the second threshold voltage.

10. The integrated circuit device for a power supply according to claim 9, wherein the discrimination circuit comprises serially-connected logic inverter circuits.

* * * * *